Oct. 15, 1946.　　A. S. KROTZ　　2,409,501
VEHICLE SUSPENSION
Filed June 15, 1943　　2 Sheets-Sheet 1
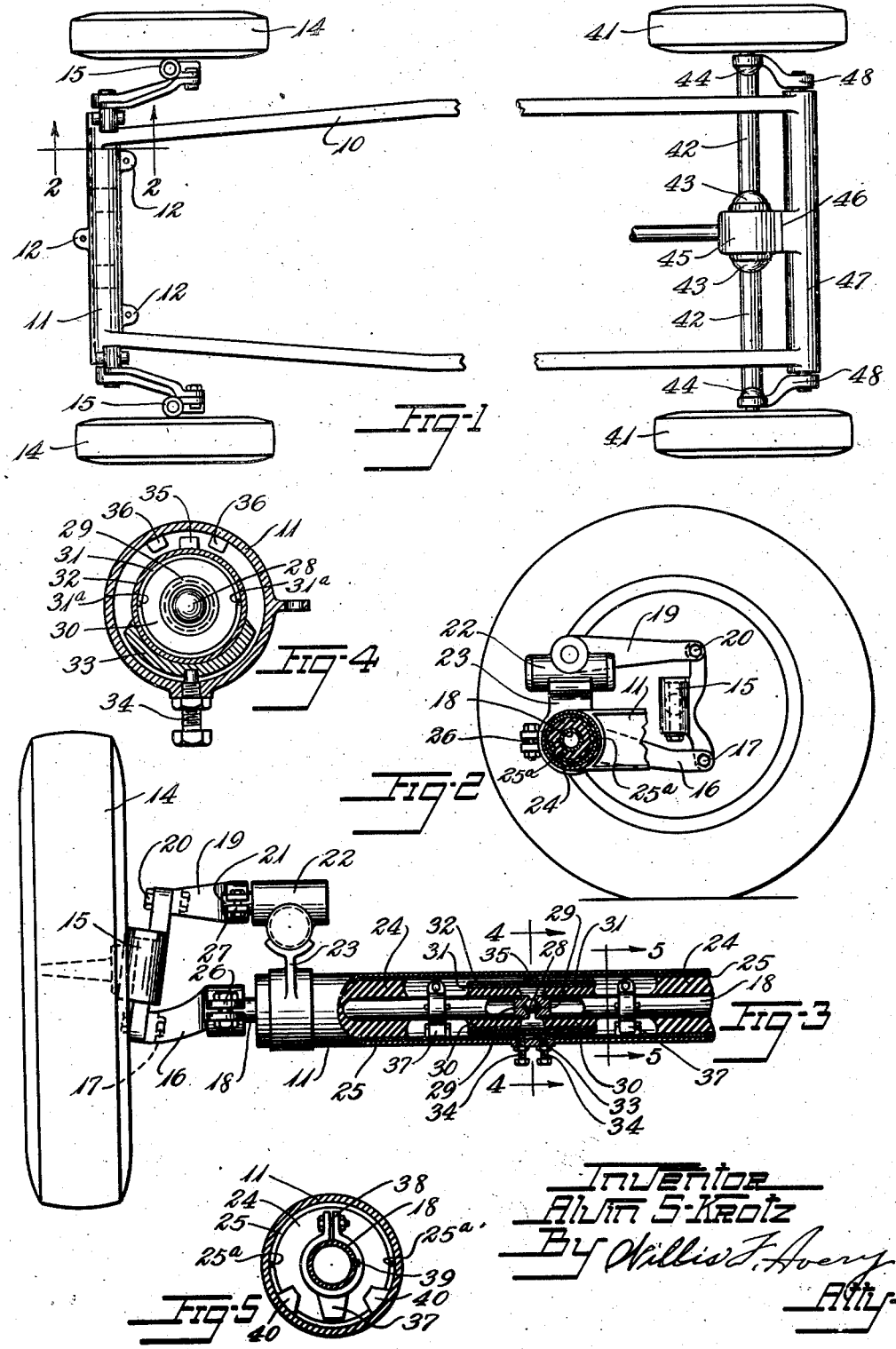

Oct. 15, 1946.  A. S. KROTZ  2,409,501
VEHICLE SUSPENSION
Filed June 15, 1943  2 Sheets-Sheet 2
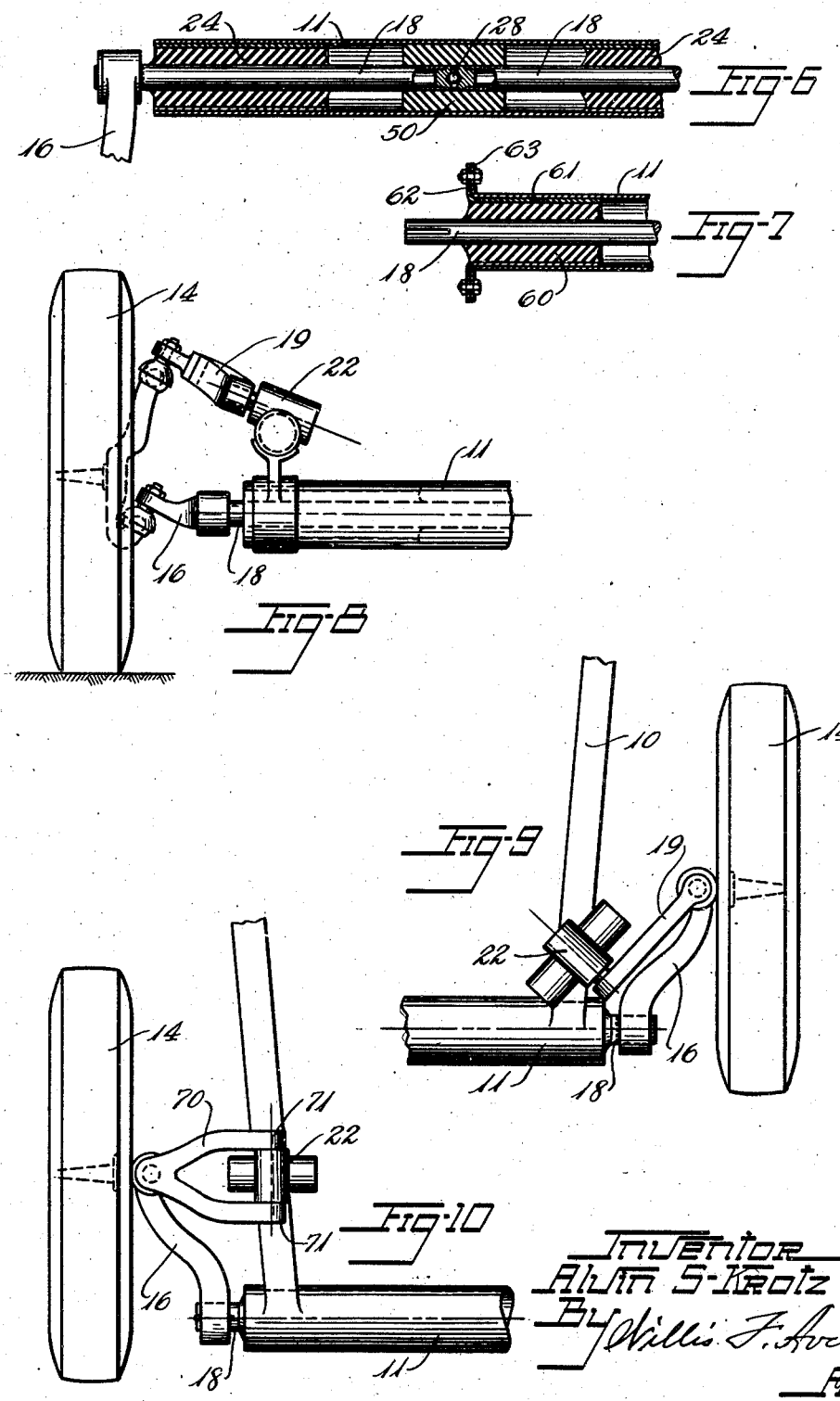

Patented Oct. 15, 1946

2,409,501

UNITED STATES PATENT OFFICE 2,409,501

VEHICLE SUSPENSION

Alvin S. Krotz, Akron, Ohio, assignor to The B. F. Goodrich Company, New York, N. Y., a corporation of New York Application June 15, 1943, Serial No. 490,887

12 Claims. (Cl. 267—21)

This invention relates to vehicle suspensions and especially to suspensions in which the vertical movements of the wheel at opposite sides of the vehicles are independent except where inter-acting sway control means are incorporated in the suspension. The invention is concerned especially with suspensions in which the wheels are supported upon arms connected with shafts extending transversely of the vehicle and provided with torsion springs for cushioning rotation of the shafts. The invention provides improvements in suspensions of this type and is directed to arrangements for utilizing resilient rubber or other rubber-like material advantageously.

Chief objects of the invention are to provide in a suspension utilizing axially aligned transverse shafts, a connecting structure including rubber for reducing vehicle swaying action through torsional shear stresses in the rubber; to provide for coaction of this rubber with main springs of rubber so that a variable springing rate is produced; to provide for reducing angular deflection of the shafts at their inner ends and to provide for adjustably supporting the same; to provide for transmitting end thrust from one shaft partially to the other while accommodating their independent rotation; to provide arm structures for connecting the springs of the wheel in arrangements giving desired control of vertical wheel movements in a manner to produce change of wheel camber or caster, or both, during wheel deflection, or maintenance of a given camber, or caster, or both, as desired; to provide compactness of structure and to provide for convenience of manufacture and assembly.

These and further objects will be apparent from the following description, reference being had to the accompanying drawings in which:

Fig. 1 is a plan view, with parts broken away, of a vehicle frame having wheels mounted thereon through suspensions constructed in accordance with and embodying the invention, Fig. 2 is a section taken along the line 2—2 of Fig. 1, Fig. 3 is a front view of the vehicle of Fig. 1, parts being broken away and sectioned.

Fig. 4 is a section taken along the line 4—4 of Fig. 3,

Fig. 5 is a section taken along the line 5—5 of Fig. 3,

Fig. 6 is a horizontal section taken through the springs and showing a modified construction.

Fig. 7 is a view like Fig. 6, but showing a further modified construction,

Fig. 8 is a view like Fig. 3, but showing a modified construction, and

Figs. 9 and 10 are plan views, each of a vehicle frame having a wheel and spring suspension of modified form.

Like numerals are used to designate like parts throughout the drawings.

Features of the invention are applicable to vehicles generally, and will be found particularly useful in automotive vehicles such, for example, as passenger automobiles, trucks and busses.

With reference first to the embodiment of Figs. 1 to 5, a frame is indicated at 10, which may consist of a structural support for a body or part of the body itself. A tubular housing 11 extending transversely of the vehicle at one end thereof, which may be the front end of the vehicle, may itself comprise a part of the frame and at the same time serve to house the springing mechanism hereinafter more fully described. In its function as a part of the frame the housing may carry ears or brackets 12, 12 for supporting parts of the vehicle, such, for example, as the motor, auxiliary mechanisms, bumpers, etc. Wheels 14, 14, being steering wheels, are mounted on wheel-supporting members 15, 15, each mounted for steering about a kingpin axis. The lower arm 16 for each of the wheels 14, 14, at its rear end is pivoted at 17 to the wheel-supporting member 15 and at its forward end is secured to a shaft 18 extending into the housing 11, the two shafts 18 terminating centrally of the housing and through their independency of rotation providing independency of vertical movements of the wheels 14, 14. For guiding the wheel deflection an upper arm 19 is pivoted at its rear end to the wheel-supporting member 15 at 20, and at its forward end is secured to shaft 21 of a shock absorber 22, the latter being mounted upon a bracket 23 secured to the housing 11.

Each shaft 18 has a spring comprising a body 24 of resilient rubber or other rubber-like material within the housing 11 and secured to the shaft and to the housing for accommodating wheel deflections by stresses in torsional shear. The spring body 24 may be secured to the shaft 18 as by a vulcanized bond of the rubber either directly to the shaft or to a sleeve secured upon the shaft, and at its outer periphery the body 24 may have a metal sleeve 25, preferably circumferentially discontinuous as by the provision of splits 25a, 25a so as to be adapted for mounting in the housing with the rubber in a state of radial compression. The spring may be secured in the housing in any desired manner as by the friction of a tight fit, by set screws, or keyways.

The arrangement is such that vertical wheel deflection causes swinging of the arm 16 and rotation of the shaft 18 so as to place the rubber spring 24 under torsional shear stress, and substantially the entire springing load may thus be carried. Thus, the upper arm 19, which need not sustain any considerable springing load may be of relatively light construction sufficient only to perform the wheel-guiding function and to operate the shock absorber. Through a split clamp connection 26, or other suitable adjustable attachment the arm 16 may be adjustably attached to the shaft in a position corresponding to the desired height of the vehicle body with reference to the wheel under static load. Likewise, a split clamp attachment 27, or other suitable adjustable connection may be provided to like purpose for securing the upper arm 19 to the shaft 21.

End thrusts upon the shaft 18 from the wheel are resisted in part by the rubber spring 24 acting in longitudinal shear. In some cases it is desirable to transmit such thrust in part to the other shaft 18. For this purpose there is provided between the inner ends of the shaft 18 a bearing which may comprise a ball 28 between a pair of face members 29, 29 secured to their respective shafts.

Also at the inner ends of the shaft 18, 18 is provided an axial rubber spring arrangement adapted to resist relative rotation of the shafts 18, 18 so that sway or tilting of the vehicle may be more effectively resisted while springing of vertical movements of the two wheels together is unaffected. Provision is also made for utilizing this axially springing arrangement in combination with the main springs for stiffening the springing rate of the whole assembly under advanced wheel movements. The construction by which these results are accomplished, with reference especially to Fig. 3, comprises bodies 30, 30 of resilient rubber or other rubberlike material mounted upon shafts 18, 18 and secured thereto preferably by a bond of vulcanization either directly to the shafts or to metal elements secured to the shafts. At their outer peripheries the bodies 30, 30 have secured thereto sleeves 31, 31 mounted in a common sleeve 32. The sleeves 31, 31 preferably are split as at 31a, 31a so as to be circumferentially discontinuous, permitting the bodies 30, 30 to be mounted in the sleeve 32 in a state of radial compression. Friction of a tight fit may be relied upon to prevent relative movement of the split sleeve 31, 31 and the outer sleeve 32 or suitable connections such as keys, set screws or the like may be provided. The arrangement hereinabove described makes possible a symmetrical disposition and operation of the bodies 30, 30 and contributes to compactness so that the construction may be readily accommodated within the housing 11 relative to which the sleeve 32 is at times rotatable.

Under load on the suspension, the inner ends of the shafts 18 tend to be deflected downward. In order to prevent any objectionable extent of such downward deflection and at the same time permit rotation of the sleeve 32, a bearing member 33 is included at the lowermost portion of the sleeve 32. This bearing member, preferably is of a lubricant-containing material such as metal or hard rubber so as to be self-lubricating. The bearing member 33 may be held in place at its desired level in the housing and also against rotation relative to the housing by means of screws 34, 34 threaded through the housing and engaging the bearing member 33, which screws provide also for adjustment of the level of the bearing 33 to regulate the height of the inner ends of the shafts 18, 18.

At the upper side of the sleeve 32 is provided a lug 35 which, after the sleeve has rotated a limited extent in either direction of rotation, is engageable with stops 36, 36 secured to the housing 11. After the wheels have moved through the range permitted by the stops further rotation of the sleeve 32 is prevented, whereupon the resilient bodies 30, 30 become stressed and their stress is additive to that of the main springs 24, 24 so that the springing rate is increased at these advanced portions of the springing range.

For limiting the extent of springing movement each shaft 18 may be provided with an arm 37 secured to it as by means of a split clamp 38 and a key 39 and engageable with stops 40, 40 on the housing 11.

In the embodiment of Fig. 1 the rear wheels 41, 41 of the vehicle, have drive shafts 42, 42 which may have flexible driving connections at 43, 43, 44, 44 with a differential 45, permitting independent wheel deflections. The differential housing may be supported at 46 on a tubular housing 47 comprising a part of the frame. Wheel-supporting arms 48, 48 may be sprung by mechanism within the tubular housing 47 which may be of the same construction and operation as hereinabove described with reference to the front suspension.

In the embodiment of Fig. 6 the inner ends of the shafts 18, 18, which may have a thrust bearing element 28 interposed between them, are rotatably mounted in a steady-rest bearing 50 which may be of suitable stiff material, preferably a self-lubricating metal, hard rubber or other bearing material to permit rotation of the shafts 18 with respect to it and to each other and also to provide effective stiffness for resisting downward deflection of the inner ends of the shaft 18, 18 as a result of the load upon the shafts at their outer ends. The bearing 50 may be eccentrically located if desired so that by rotatively adjusting this bearing and securing it in the adjusted position the height of the inner ends of the shafts may be adjusted.

In the embodiment of Fig. 7 the main spring comprises a resilient body 60 secured as by bonding to the shaft 18 and to an outer sleeve 61 which may be split and which has at its outer end a flange 62 cooperating with a flange 63 upon the housing 11. The flanges 62 and 63 may be apertured, with a different number of apertures so as to provide many positions of rotative adjustment of the spring relative to the housing, whereby the height of the vehicle body under normal load relative to the wheels can be adjusted as desired.

In some cases it is desirable to modify the control of the wheel deflections in the course of the springing movements to improve riding qualities, reduce wear on the tires, or for other reasons. For example, it is sometimes desirable to change the camber of the wheel, particularly to lessen the angle of camber as the wheel rises, and it is sometimes desirable to cause a change in caster during the springing movement, either alone or together with a change in camber. In the embodiment of Fig. 8 the axis of the upper arm 19, instead of being disposed generally parallel to the axis of the shaft 18 is mounted in an angle oblique to such axis as viewed from the front, which makes possible a swinging of the upper part of the wheel inwardly toward the vehicle to some extent as the wheel rises and thus cause the wheel to lose camber.

In the embodiment of Fig. 9 the axis of the upper arm 19 is oblique to the axis of the shaft 18 as viewed from above so that as the wheel rises the lower part of the kingpin axis rises generally vertically while the upper part of such axis swings toward the vehicle so that the wheel loses camber as it rises, and also the wheel changes its caster angle.

In the embodiment of Fig. 10 wherein the axis of the upper arm, here designated as 70, is substantially at right angles to the axis of the shaft 18 as viewed from the top. In the arrangement of Fig. 10, fore and aft stability of the upper part of the kingpin axis may be provided by the wishbone form of the arm 70 providing two pivotal connections at 71, 71, spaced-apart longitudinally of the vehicle and at two sides of the shock absorber 22, the arrangement being such that effective fore and aft stability is provided while at the same time camber change as the wheel rises is accomplished through swing of the upper arm and change in caster is effected through swing of the lower arm, these swings being in vertical planes at right angles to each other.

Variations may be made without departing from the scope of the invention as it is defined in the following claims.

I claim:

1. A vehicle spring suspension comprising a tubular housing extending transversely of the vehicle, a pair of shafts extending into said housing from the ends of the latter and having wheel-supporting arms at their outer ends, bodies of resilient material between said shafts and housing and secured to each for resiliently resisting deflection of said arms, a sleeve rotatable within said housing and telescopically overlapping the inner ends of said shafts, bodies of resilient material between said sleeve and said shafts and secured to both said sleeve and said shafts to resist relative rotation of said shafts, and a bearing in said housing for said sleeve.

2. A vehicle spring suspension comprising a tubular housing extending transversely of the vehicle, a pair of shafts extending into said housing from the ends of the latter and having wheel-supporting arms at their outer ends, bodies of resilient material between said shafts and housing and secured to each for resiliently resisting deflection of said arms, a sleeve rotatable within said housing and telescopically overlapping the inner ends of said shafts, bodies of resilient material between said sleeve and said shafts and secured to both said sleeve and said shafts to resist relative rotation of said shafts, a bearing in said housing at the lowermost part of said sleeve, and means for adjusting said bearing vertically in said housing.

3. A vehicle spring suspension comprising a support, a pair of axially aligned shafts extending transversely of the vehicle and having wheel-supporting arms at their outer ends, springing means connected with said shafts for resiliently resisting deflection of said arms, a sleeve telescopically overlapping the inner ends of said shafts and rotatable with respect to said support, bodies of resilient material between said shafts and said sleeve and secured to both said sleeve and said shafts to resist differential movement of said shafts, and substantially unyieldable bearing means interposed between the inner ends of said shafts and mounted thereon independently of said support for transmitting thrust axially from one shaft to the other while permitting relative rotation of said shafts.

4. A vehicle spring suspension comprising a pair of axially aligned shafts extending transversely of the vehicle and having wheel-supporting arms at their outer ends, springing means connected with said shafts for resiliently resisting deflection of said arms, a sleeve structure connected with the inner end of one of said shafts and having a portion overlying the inner end portion of the other shaft, a body of resilient rubber-like material between said other shaft and said sleeve structure and secured to both said sleeve structure and said other shaft to resist relative rotative movement of said shafts by stress of the resilient material, and stop means associated with said sleeve structure for limiting the extent of rotation thereof.

5. A vehicle spring suspension comprising a pair of axially aligned shafts extending transversely of the vehicle and having wheel-supporting arms at their outer ends, springing means connected with said shafts for resiliently resisting deflection of said arms, a sleeve structure connected with the inner end of one of said shafts and having a portion overlying the inner end portion of the other shaft, a body of resilient rubberlike material between said other shaft and said sleeve structure and secured to both said sleeve structure and said other shaft to resist relative rotative movement of said shafts by stress of the resilient material, stop means for limiting the extent of rotation of said sleeve structure, and additional stop means, individual to each of said shafts, for limiting the extent of rotation of said shafts.

6. A vehicle spring suspension comprising a frame, a pair of axially aligned shafts extending transversely of the vehicle and having arms at their outer ends, wheel-supporting members to which said arms are pivoted, bodies of resilient rubber-like material between each said shaft and said frame and secured to both for resiliently resisting deflection of said arms, at least one body of rubber-like material at the inner ends of said shafts and secured to both for resiliently resisting relative rotation of said shafts, and additional arms spaced vertically from the first said arms and pivoted to said wheel-supporting member and said frame for controlling vertical wheel movements, said additional arms each being pivoted to said frame on an axis at an angle, oblique as viewed from above, to the axis of the adjacent of said shafts.

7. A vehicle spring suspension comprising a frame, a pair of axially aligned shafts extending transversely of the vehicle and having arms at their outer ends, wheel-supporting members to which said arms are pivoted, bodies of resilient rubber-like material between said shaft and said frame and secured to both for resiliently resisting deflection of said arms, and additional arms spaced vertically from the first said arms and pivoted to said wheel-supporting member and said frame for controlling vertical wheel movements, said additional arms being of wishbone shape and pivoted to said frame at spaced-apart positions in the longitudinal direction of the vehicle.

8. A vehicle spring suspension comprising a frame structure, a tubular housing extending transversely of said frame structure, a pair of shafts extending into said housing from the ends of the latter and having arms at their outer ends extending generally in the fore and aft direction of the vehicle, wheel-supporting members to which said arms are pivoted, bodies of resilient material between said shaft and housing and secured to each for resiliently resisting deflection of said arms, additional arms spaced vertically from the first said arms and pivoted to said wheel-supporting member and to said frame structure for controlling vertical wheel movements, a sleeve rotatable within said housing and telescopically overlapping the inner ends of said shaft, bodies of resilient material between said sleeve and said shafts and secured to both said sleeve and said shafts to resist relative rotation of said shafts, stop means between said housing and said sleeve for limiting rotative movement of the latter and adjustable bearing means between said sleeve and said housing for resisting downward deflection of said sleeve.

9. A vehicle spring suspension comprising a pair of axially aligned shafts extending transversely of the vehicle and having wheel-supporting arms at their outer ends, springing means connected with said shafts for resiliently resisting deflection of said arms, a sleeve telescopically overlapping the inner ends of said shafts, bodies of resilient material between said shafts and said sleeve and secured to both said sleeve and said shafts to resist differential movement of said shafts, a structural support extending transversely of the vehicle adjacent said shafts, and a bearing mounted upon said support and bracing said sleeve against downward deflection.

10. A vehicle spring suspension comprising a pair of axially aligned shafts extending transversely of the vehicle and having wheel-supporting arms at their outer ends, springing means connected with said shafts for resiliently resisting deflection of said arms, a sleeve telescopically overlapping the inner ends of said shafts, bodies of resilient material between said shafts and said sleeve and secured to both said sleeve and said shafts to resist differential movement of said shafts, a structural support extending transversely of the vehicle at a position beneath said sleeve, and a bearing for said sleeve mounted beneath the latter upon said support.

11. A vehicle spring suspension comprising a pair of axially aligned shafts extending transversely of the vehicle and having wheel-supporting arms at their outer ends, springing means connected with said shafts for resiliently resisting deflection of said arms, a sleeve telescopically overlapping the inner ends of said shafts, bodies of resilient material between said shafts and said sleeve and secured to both said sleeve and said shafts to resist differential movement of said shafts, a structural support extending transversely of the vehicle at a position beneath said sleeve, and a bearing for said sleeve mounted beneath the latter upon said support, said bearing including means for adjusting the bearing vertically with respect to said support.

12. A vehicle spring suspension comprising a frame, a pair of axially aligned shafts extending transversely of the vehicle and having arms at their outer ends, wheel-supporting members to which said arms are pivoted, bodies of resilient rubber-like material between each said shaft and said frame and secured to both for resiliently resisting deflection of said arms, at least one body of rubber-like material at the inner ends of said shafts and secured to both for resiliently resisting relative rotation of said shafts, and additional arms spaced vertically from the first said arms and pivoted to said wheel-supporting member and said frame for controlling vertical wheel movements, said additional arms each being pivoted to said frame on an axis at substantially a right angle to the axis of the adjacent of said shafts as viewed from above.

ALVIN S. KROTZ.